United States Patent
Marissal et al.

(10) Patent No.: US 11,285,633 B2
(45) Date of Patent: Mar. 29, 2022

(54) METHOD FOR THE ACETYLATION OF WOOD

(71) Applicant: Tricoya Technologies Ltd, London (GB)

(72) Inventors: Daniel Marissal, London (GB); Theodorus Gerardus Marinus Maria Kappen, London (GB)

(73) Assignee: TRICOYA TECHNOLOGIES LTD, London (GB)

(*) Notice: Subject to any disclaimer, the term of this patent is extended or adjusted under 35 U.S.C. 154(b) by 19 days.

(21) Appl. No.: 15/564,979

(22) PCT Filed: Apr. 13, 2016

(86) PCT No.: PCT/EP2016/058147
§ 371 (c)(1),
(2) Date: Oct. 6, 2017

(87) PCT Pub. No.: WO2016/166177
PCT Pub. Date: Oct. 20, 2016

(65) Prior Publication Data
US 2018/0093390 A1    Apr. 5, 2018

(30) Foreign Application Priority Data

Apr. 13, 2015 (EP) .................................. 15163386

(51) Int. Cl.
| | | |
|---|---|---|
| B27K 3/02 | (2006.01) | |
| C08B 3/20 | (2006.01) | |
| C08B 3/06 | (2006.01) | |
| C08H 8/00 | (2010.01) | |
| B27K 3/36 | (2006.01) | |
| B27K 3/08 | (2006.01) | |

(52) U.S. Cl.
CPC .......... *B27K 3/0278* (2013.01); *B27K 3/0271* (2013.01); *B27K 3/36* (2013.01); *C08B 3/06* (2013.01); *C08B 3/20* (2013.01); *C08H 8/00* (2013.01); *B27K 3/08* (2013.01)

(58) Field of Classification Search
CPC ...... B27K 3/0271; B27K 3/0278; B27K 3/08; B27K 3/36
See application file for complete search history.

(56) References Cited

U.S. PATENT DOCUMENTS

| | | | | |
|---|---|---|---|---|
| 3,094,431 | A * | 6/1963 | Goldstein | ................ C08H 8/00 34/404 |
| 5,525,721 | A | 6/1996 | Ohshima et al. | |
| 5,608,051 | A | 3/1997 | Nelson et al. | |
| 5,777,101 | A | 7/1998 | Nelson et al. | |
| 6,632,326 | B1 * | 10/2003 | Hirano | ..................... B27N 1/00 156/62.4 |
| 2007/0044416 | A1 * | 3/2007 | Van Dijk | ................ E04F 13/18 52/650.3 |
| 2010/0331531 | A1 | 12/2010 | Mykytka | |
| 2013/0202789 | A1 * | 8/2013 | Cwirko | .................. B27K 3/025 427/212 |
| 2013/0295365 | A1 | 11/2013 | Girota | |
| 2013/0303751 | A1 * | 11/2013 | Rowell | ..................... C08H 8/00 536/120 |
| 2015/0051386 | A1 | 2/2015 | Pol et al. | |

FOREIGN PATENT DOCUMENTS

| | | |
|---|---|---|
| JP | 7-179501 | 10/1994 |
| JP | 2011-510842 | 4/2011 |
| JP | 2015-511549 | 4/2015 |
| WO | 2012037481 A1 | 3/2012 |
| WO | 2013117641 A1 | 8/2013 |
| WO | 2013/139937 | 9/2013 |
| WO | WO 2013/139937 | 9/2013 |
| WO | WO 2013/165247 | 11/2013 |

\* cited by examiner

*Primary Examiner* — Nathan H Empie
(74) *Attorney, Agent, or Firm* — Innovation Capital Law Group, LLP; Vic Lin

(57) ABSTRACT

The present invention provides a method for the acetylation of wood comprising treating the wood with an acetylation medium under wood acetylation reaction conditions and drying the acetylated wood, wherein the drying comprises at least two steps, wherein the wood is first dried with a first drying medium and then with a second drying medium.

13 Claims, No Drawings

METHOD FOR THE ACETYLATION OF WOOD

The invention relates to the field of wood acetylation. Particularly, the present invention provides a method for the acetylation of wood including a step of drying the acetylated wood.

BACKGROUND OF THE INVENTION

Acetylation of wood is used to improve the durability of wood and of wood elements used in the preparation various products such as fibre boards. Acetylation is typically performed in a batch or continuous type of reactor. After the acetylation process is finished, the acetylated wood is typically dried to remove the chemicals.

When wood is acetylated in industrial amounts, it is a general desire to acetylate in a relatively quick and economical way. This especially holds for continuous processes that often use a particular residence time of the wood in the reactor. It is therefore desired that also the drying step following the acetylation step is performed in a quick and efficient way.

It is an object of the present invention to provide a method for the acetylation of wood that allows fast and efficient removal of the residual chemicals from the acetylated wood.

SUMMARY OF THE INVENTION

In order to better address one or more of the foregoing desires, the invention presents, a method for the acetylation of wood comprising treating the wood with an acetylation medium under wood acetylation reaction conditions and drying the acetylated wood, wherein the drying comprises at least two steps, wherein the wood is first dried with a first drying medium and then with a second drying medium.

DETAILED DESCRIPTION OF THE INVENTION

The invention, in a broad sense, is based on the judicious insight that the drying of acetylated wood following an acetylation process can be carried out more efficiently in several steps, using different drying media. Drying in the present invention refers to a post-reaction step, that is, after the acetylation reaction, or after all the acetylation reaction steps in case several reaction steps are carried out. During this post-reaction drying residual chemicals are removed from the acetylated wood (particularly, the acetylation medium and reaction by-products). In some embodiments, drying aims to remove the residual amounts of acetic acid and acetic anhydride after the acetylation step(s). Drying as used throughout this application is hence distinctly different from removing water from non-acetylated wood, as often done in a pre-acetylation step.

According to the present invention, the wood is dried in at least two steps. It is first dried with a first drying medium and then with a second drying medium, optionally wherein the first drying medium has a higher heat capacity than the second drying medium and/or the first drying medium comprises a higher content (mol %) of acetylation medium than the second drying medium. While some conventional techniques use a hot inert gas for drying, it may take considerable time to lower the amount of impurities to an acceptable level. A longer drying time is especially applicable to high pressure acetylation processes because after the pressure release following the acetylation step, the wood is cooled down due to flashing and needs to be reheated. If the drying is done using an inert gas such as nitrogen, due to its low heat capacity it takes more time before the wood is dried.

This problem is solved by first drying with a first, preferably high heat capacity drying medium and then drying with a second drying medium. The first drying medium preferably has a higher heat capacity and serves two goals. Firstly, it efficiently heats up the wood and, secondly, it is able to remove the chemicals from the wood to a certain level. While that level may still be too high compared to industrial requirements, using another drying medium, preferably an inert gas, in a second step allows to lower the content of the chemicals to a sufficiently low level, which meets industry standards (<0.5 wt. % for residual acetic acid). A combination of both steps, therefore, achieves a quick and efficient drying of acetylated wood to a low residual acetic acid content. The use a an acetylation medium in the first step also enables efficient integration of drying purge gases in the acetylation process whilst also minimizing the use, and subsequent purification, of inert gases. The use of an inert gas in the final stage enables low residual hydrocarbon levels. Thus the judicious selection of drying medium, optionally recycle and purge gas flows and residence time in each drying stage enables an improved drying efficiency.

The wood suitable for the method according to the invention can be either solid wood or wood elements. Solid wood would typically have a width and a thickness of from 1 to 30 cm, and a length of from 1 to 6 m.

Preferably, the wood has a width and a thickness of from 2 to 10 cm and a length of 1.5-4 in. However, other dimensions can also be used.

In a preferred embodiment, the wood is in the form of wood elements. Preferably, the wood elements have a size of a height and width from 0.1 cm to 3 cm, and a length of 1 to 7 cm. In some embodiments it may be preferred to have the wood elements with a height and width from 1 to 2.5 cm, and a length of 2-5 cm, for example approximately 2.5 cm×1.5 cm×1.5 cm in size. The morphology of the wood elements may be, but is not limited to, wood chips, wood fibres, wood flour, wood strands, wood shavings, etc. In a preferred embodiment, the wood elements are wood chips. The wood or wood elements preferably belong to non-durable wood species such as soft woods, for example, coniferous trees, spruce, pine or fir or to non-durable hardwoods, typically spruce, pine or fir beech, birch, eucalyptus, poplar or alder.

Preferably, the wood has a moisture content of at most 6 wt. % dry base, before the acetylation. After chipping the trees, the green wood has a typical natural moisture content (MC) of >100 wt. % based on the dry weight. The moisture content of the wood is preferably lowered to below 6 wt. % dry weight, before the wood is treated in the acetylation process. At higher moisture contents too much of the acetylation medium (typically containing acetic anhydride) will be consumed in a reaction with water in the wood instead of with the hydroxyl groups in the wood, which makes the acetylation process less efficient. Another disadvantage of a too high MC is that the strong exothermic reaction of acetic anhydride with water in the wood can lead to local overheating in the wood and discoloration of the wood may occur. More preferably, the moisture content is less than 4 wt. %, ideally less than 3 wt. %. Lowering of the moisture content can be achieved by conventional continuous or batch drying techniques.

According to the method of the present invention, the wood is acetylated to obtain acetylated wood. Acetylation is achieved by treating the wood with an acetylation medium under wood acetylation reaction conditions. Under "acetylation medium" it is understood a compound or a mixture of compounds that are able to acetylate the hydroxyl groups of cellulose in the wood. For example, acetic acid or acetic anhydride are suitable acetylation media. Preferably, the acetylation medium comprises acetic acid, acetic anhydride or a mixture thereof. More preferably, the acetylation medium comprises a mixture of acetic acid and acetic anhydride. Particularly, such mixture preferably comprises at least 50 wt. %, more preferably at least 85 wt. % of acetic anhydride.

Under "wood acetylation reaction conditions" the conditions are understood under which the wood undergoes acetylation. A skilled person is aware of specific temperature and pressure conditions to achieve acetylation of wood. Usually acetylation is performed under an elevated temperature, e.g. at a temperature 70-190° C. An example of an acetylation process is the one described in EP 680810. Preferably, the acetylation conditions comprise heating at a temperature in the range 160-190° C.

In a particularly preferred embodiment, the acetylation takes place at an increased pressure, preferably at least 1 barg. More preferably, the pressure in the acetylation reactor is in the range 1.5-5 barg, yet more preferably 2-3.5 barg. When the acetylation takes place under an increased pressure, the pressure is ideally released before entering the finishing step, i.e. prior to drying. Since the wood still contains liquid from the acetylation step after the acetylation, the release of the pressure will result in a rapid cooling of the wood due to flashing. In the method according to the present invention, the two-step drying provides for a rapid and efficient re-heating of the cooled wood to the temperature of drying and removal of remaining chemicals from the wood.

The unreacted acetylation medium from the acetylation step is preferably recycled and re-used in the process. This can be realised by condensing the vapour at the exit part of the reactor and separating by distillation of acetic anhydride. Separated acetic anhydride can then be re-used in the process and separated acetic acid can be stored or used in another process, or converted to acetic anhydride by known methods.

In case the acetylation is conducted at an elevated pressure, the pressure is substantially released at the end of the acetylation reaction. Preferably the pressure drops to about −0.4 barg to 0.3 barg.

In one embodiment of the present process the acetylated wood at the end of acetylation contains at least 55 wt. % liquid on dry basis of the acetylated wood weight. When an elevated pressures is used, the above-mentioned liquid content refers to the wood before depressurization.

In one embodiment, depressurisation is achieved by discharging the acetylated material from the reactor using a an arrangement of one or more rotary valves and/or sluice gates.

In a further step, the acetylated wood is dried. Drying means the removal of the acetylation medium and reaction products from the acetylated wood. During drying acetic acid and unreacted acetic anhydride are removed, preferably to a level of below 0.5 wt. %.

An important characteristic of the present invention is that the drying comprises at least two steps wherein different drying media are used.

In a first step, the wood is dried with a first drying medium, which preferably comprises an acetylation medium vapour and more preferably comprises superheated acetylation medium vapour. Superheated medium means heated to a temperature higher than its boiling point, without boiling. By its nature, the superheated acetylation medium is suitable for drying the acetylated wood containing liquid acetylation medium and other acetylation residues. The first drying medium has preferably a higher heat capacity than the heat capacity of the second drying medium, used in a following step. The first drying medium preferably comprises a higher content (mol %) of acetylation medium than the second drying medium.

The acetylation medium vapour preferably comprises acetic acid, acetic anhydride or a mixture thereof. Suitably, the acetylation medium vapour can comprise the unreacted acetylation medium from the acetylation step, which is preferably recycled an re-used in the process.

The first drying medium preferably comprises at least 90 wt. % of the acetylation medium (preferably, a mixture of acetic acid and acetic anhydride) and a maximum of 10 wt. % of an inert gas such as nitrogen or the like. Preferably, the acetylation medium is a mixture of acetic acid and acetic anhydride. An example of a preferred composition of the first drying medium is 20-50 wt. % acetic acid, 50-80 wt. % acetic anhydride and 0-3 wt. % of nitrogen.

Preferably, the residence time in the first drying step is 5-25 min. The gas to solid flow rate in first drying step is preferably 1-6 mass ratio.

In a second drying step, the wood is dried with a second drying medium, which is preferably an inert gas. Inert gas means that it is inert to the wood or the acetylation reaction. Preferably, the inert gas is nitrogen, carbon dioxide or flue gas. More preferably, the inert gas is nitrogen.

In both steps, conventional drying techniques can be used, for example blowing with a (hot) gas over the wood. Preferably, the acetylated wood is dried in either or both of the drying steps at a temperature in the range 150-190° C., more preferably in the range 160-180° C. The drying in the first and/or the second step is preferably carried out at a pressure lower than the acetylation reaction pressure. Preferably, ambient pressure is used during drying, more preferably the pressure from −0.4 barg to 0.3 barg is used.

The residence time in the second drying step is preferably 15-40 min. The gas to solid flow rate in first drying step is preferably 0.7-5 mass ratio.

Preferably, the acetylated wood before discharging or depressurization contains at least 55 wt. % liquid on dry basis of the acetylated wood weight; after flashing—i.e. at beginning of the first drying step, the liquid content is typically reduced to at least 30 wt. %. During the first drying step this liquid content is typically reduced to 2-8 wt. %, at most 10 wt. %. During the second drying step this is further reduced to max 0.5 wt. % on dry basis.

The described two drying steps can suitably take place in vessels that ensure a minimum residence time for all wood elements and that provide for good, preferably uniform distribution, of the drying medium through the wood elements in the dryer. The drying medium may flow in a counter-current or cross-current manner relative to the wood elements. The drying medium used for each drying step is preferably recycled to achieve the required drying flowrate with minimum make-up gas requirement. Each such recycle loop may be provided with (i) cooling to condense and then separate degassed hydrocarbons from the recycled drying medium and/or (ii) a vapor make-up or purge to maintain mass balance. The drying medium fed to each step is preferably heated prior to introduction into the drying vessel.

The drying vessel may be a batch or continuous, optionally a plug flow, vessel or silo. The drying vessel may alternatively be a screw device with a cross-flow of drying gas.

The acetylation reaction and the drying steps can be each performed in a continuous manner or batchwise. Preferably, the acetylation reaction and/or each of drying steps are carried out as a continuous process, more preferably all the three mentioned steps are carried out in a continuous manner. In an alternative embodiment, the acetylation reaction and/or any of the drying steps is carried out batchwise. Preferably, all the three mentioned steps are carried out batchwise.

One or more of the acetylation reaction and each of the drying steps may be effected in the same or in separate vessels. In one embodiment, the acetylation reaction and each of the drying steps are performed in a separate vessel, preferably with each step being continuous. In an alternative embodiment, the acetylation reaction and each of the drying steps are performed in the vessel, preferably with each step being batchwise.

The dried acetylated wood can be cooled down to room temperature. Conventional techniques can be used for that such as air cooling or water cooling.

An important advantage of the method according to the present invention is that it allows the obtaining of acetylated wood with a high acetylation degree and low residual acid content in a quick and efficient way. Due to the above-described two-step drying procedure with different drying media, the wood can efficiently and fast be (re-)heated and the residual chemicals be removed in a relatively short period of time. The total drying time is preferably under 90 min, more preferably in the range 20-65 min.

Preferably, the acetyl content of the acetylated wood is from 17% to 26%, as measured by high-pressure liquid chromatography (HPLC), preferably at least 19%, more preferably 21%.

The residual acetic acid (RA) content is a measure of the residual, non-bound acetic acid or from hydrolysis of residuals of unreacted acetic anhydride contained in the wood. Acetic acid may also originate from the wood itself, therefore the RA measures both the original acetic acid and the acetic acid left from the acetylation reaction. For determining the residual acid (RA) a well defined amount of 3-5 g of sample material is shaken in demineralised water for 1 hr. After this extraction step the sample is separated from the water fraction by filtration. Subsequently this water fraction is titrated with a known sodium hydroxide (NaOH) solution, using phenolphthalein as an indicator, from which the residual acid concentration of the sample can be calculated.

The method according to the present invention allows to achieve the RA of the acetylated wood below 1% by weight, preferably below 0.9%, more preferably below 0.5% by weight. Most preferably, the acetylated wood contains less than 0.2% of residual acid by weight. In a preferred embodiment, the RA content is from 0.05 to 0.9 wt. %. One of the advantages of the low levels of residual acetic acid is that the wood does not have any odour of acetic acid.

Acetylated wood obtained according to the method of the present invention may be used in various applications. Acetylated wood elements may usefully be refined and converted to board, such as medium density fibreboard, which will possess the superior dimensional stability, durability, stability to ultra-violet light and thermal conductivity, compared with boards derived from non-acetylated wood elements.

The following non-limiting example serves to illustrate the invention. In this example and throughout this specification, all percentages, parts and ratios are by weight unless indicated otherwise.

EXAMPLE

A mixture of wood chips with dimensions 2.5 cm×1.5 cm×1.5 cm consisting of 80% Sitka Spruce with 20% Loblolly Pine has been dried to a moisture content of 2.5%. This mixture is fed to an acetylation step where it is sprayed with liquid acetic anhydride/acetic acid mixture and heated with superheated acetic anhydride/acetic acid mixture (where the liquid to gas ratio is 1:2.5 wt:wt) to a temperature of 180° C. at a pressure of 2.5 barg. The weight ratio of acetic anhydride to acetic acid in the acetylation medium mixture is 90:10. After a residence time of 30 minutes at these conditions the pressure is released and the wood chips are transferred to the drying step, which proceeds at 0 barg. The first drying step occurs with a gas flow to solid flow ratio of 3.2:1 (mass:mass) with a gas phase composition of 33% acetic acid, 65% acetic anhydride and 2% nitrogen. The residence time for this step is 15 minutes, where the chips are heated with a temperature of 170° C. Subsequently the chips are transferred to the second drying step, where the chips are heated with nitrogen at 170° C. for 25 additional minutes. This process resulted in acetylated wood chips with an acetyl content (AC) of 23.2% and a residual acid content of 0.3 wt. %.

The invention claimed is:

1. A method for the acetylation of wood comprising:
   a) treating the wood with an acetylation medium under wood acetylation reaction conditions, wherein the wood acetylation conditions comprise an acetylation pressure of at least 2 barg, to give acetylated wood,
   b) thereafter reducing the pressure to a first acetylation pressure in the range of −0.4 barg to 0.3 barg and flashing the acetylated wood, and
   c) thereafter drying the acetylated wood, wherein the drying comprises a first drying step performed at a pressure of −0.4 barg to 0.3 barg and a subsequent second drying step performed at a pressure of −0.4 barg to 0.3 barg,
   wherein the first drying step comprises drying the acetylated wood at a temperature in the range of 150-190° C. in a drying vessel while supplying a flow of a first drying medium comprising an acetylation medium vapour into the drying vessel, and further wherein the second drying step comprises drying the acetylated wood using a second drying medium which is an inert gas and which is different from the first drying medium.

2. The method according to claim 1, wherein the first drying medium has a higher heat capacity than the second drying medium.

3. The method according to claim 1, wherein the acetylation medium comprises acetic acid, acetic anhydride or a mixture thereof.

4. The method according to claim 1, wherein the acetylation medium comprises a mixture of acetic acid and acetic anhydride, comprising at least 50 wt. % acetic anhydride.

5. The method according to claim 1, wherein the acetylation conditions comprise heating to a temperature in the range 160-190° C. and wherein the acetylation pressure is in the range of 2 to 3.5 barg.

6. The method according to claim 1, wherein in the first drying step the residence time is 5-25 min.

7. The method according to claim 1, wherein in the second drying step the residence time is 15-40 min.

8. The method according to claim 1, wherein the liquid content in the acetylated wood after said acetylation step a) and at the beginning of step b) is at least 55 wt. % on dry basis of the acetylated wood.

9. The method according to claim 1, wherein the liquid content of acetic acid and unreacted acetic anhydride in the acetylated wood prior toat the beginning of step b) is at least 55 wt. % liquid on dry basis of the acetylated wood and is reduced during the first drying step to 2 to 8 wt. % of acetic acid and unreacted acetic anhydride on dry basis of the acetylated wood at the end of the first drying step and is reduced in the second drying step to max 0.5 wt. % of acetic acid and unreacted acetic anhydride on dry basis of the acetylated wood and wherein the acetylation medium comprises a mixture of acetic acid and acetic anhydride and wherein the acetylation medium comprises at least 50 wt. % acetic anhydride.

10. The method of claim 1, wherein the dried acetylated wood of step c) comprise wood elements with a height and width of from 1 to 2.5 cm and a length of 2 to 5 cm.

11. The method of claim 1, wherein the first drying medium comprises at least 90 wt. % of a mixture of acetic acid and acetic anhydride.

12. The method of claim 11, wherein a gas to solid flow rate in the first drying step is 1-6 mass ratio.

13. The method of claim 1, wherein step a) is carried out in a reactor, wherein the reactor comprises one or more rotary valves and/or sluice gates for discharging acetylated wood, wherein in step b) depressurization is achieved by discharging the acetylated wood from the reactor through said one or more rotary valves and/or sluice gates; and wherein the first drying step is carried out in a drying vessel that is a screw device with a cross-flow of first drying medium.

* * * * *